Nov. 25, 1952 H. M. MARTIN 2,619,303
SIGNAL BUOY BALLOON
Filed June 11, 1949
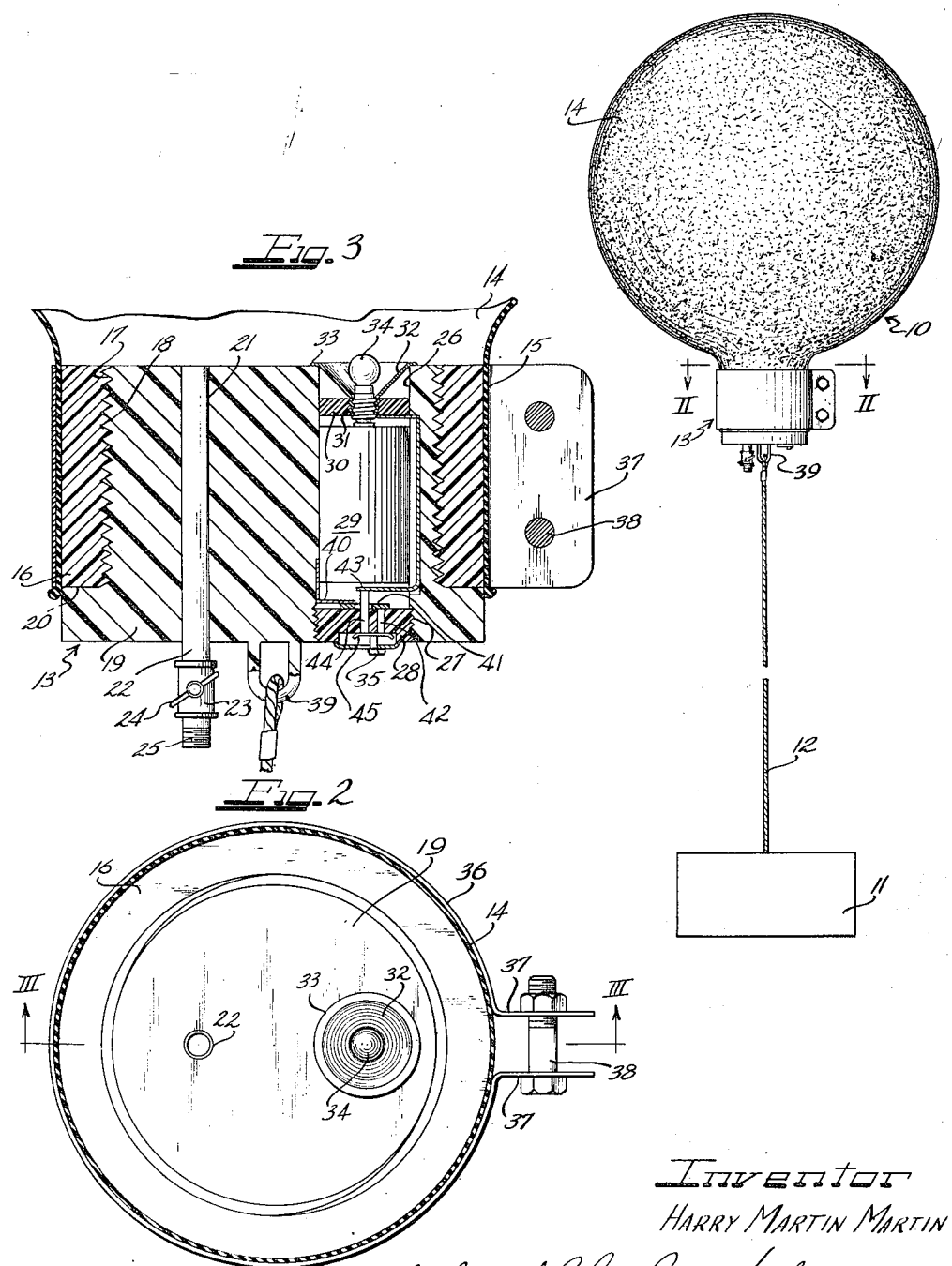
Inventor
HARRY MARTIN MARTIN
by The Firm of Charles W. Hills Attys.

Patented Nov. 25, 1952

2,619,303

UNITED STATES PATENT OFFICE 2,619,303

SIGNAL BUOY BALLOON

Harry Martin Martin, Tucson, Ariz.

Application June 11, 1949, Serial No. 98,440

7 Claims. (Cl. 244—33)

The present invention relates to a signal buoy balloon and more particularly to a lighter-than-air signal buoy provided with means for enhancing the possibility of visual or electrical detection of the device under adverse conditions.

Various types of distress signal devices have been proposed in the prior art, a number of these devices being in the form of an inflatable balloon and serving as an indicator for the location of accidents, persons in distress, and the like. However, such devices are typically detectable only by visual means which limits their use to the daylight hours and then only under favorable weather conditions.

The present invention now provides an improved type of signal buoy balloon equipped with means for enhancing the possibility of detection of the buoy. The device of the present invention is primarily intended to serve as a marker for rescue work and may be employed by campers, hunters, mountain climbers, boats, airplanes and the like. Also, the device may serve as a highway marker at the scene of an accident or as a school zone marker, or as an indicator at dangerous intersections and the like.

In general, the device of the present invention includes an inflatable bladder or envelope capable of assuming a generally spherical shape when inflated. The balloon is secured to a base by means of a clamping collar or the like, the base carrying means attachable to a source of lighter-than-air gas for inflating the balloon. The base is insertable within the inflation mouth of the balloon, and the inflation means carried thereby communicates with the interior of the balloon. The base also carries means for illuminating the interior of the balloon, such as a dry cell or other type of battery and a bulb for receiving current from the battery, the bulb also communicating with the interior of the balloon. The balloon itself is preferably impregnated with metallic material such as aluminum, iron or the like powdered metal, or any other electrically conductive material so that the balloon may be detected by electrical search means, such as conventional radar apparatus.

It is, therefore, an important object of the present invention to provide an improved, simple, inexpensive signal buoy balloon.

Another important object of the present invention is to provide an improved form of lighter-than-air signal buoy provided with means for enhancing the possibility of visual or electrical detection of the buoy.

A further important object of the present invention is to provide an inflatable signal buoy including an inflatable envelope adapted to be filled with a fluid under pressure and a base adapted to be secured to the envelope, the base providing means for filling the interior of the envelope with fluid and also carrying means for illuminating the interior of the envelope.

Still another important object of the present invention is to provide a lighter-than-air signal buoy including an envelope adapted to be filled with a fluid under pressure, the envelope being impregnated with a material capable of detection by electrical detection apparatus, such as radar.

Other and further important objects of the present invention will be apparent from the disclosures in the specification and the accompanying drawings.

On the drawings:

Figure 1 is a side elevational view of a signal buoy balloon of the present invention;

Figure 2 is a sectional view taken along the plane II—II of Figure 1; and

Figure 3 is a sectional view, with parts shown in elevation, taken along the plane III—III of Figure 2.

As shown on the drawings:

In Figure 1, reference numeral 10 refers generally to a signal buoy balloon of the present invention including a box-like container 11, a rope or cord 12, a base 13 secured to the container 11 by means of the rope 12 extending through a loop or bight 39 formed on the base 13, and an inflatable envelope or bag 14 secured to the base 13.

The container 11 is of such size as to readily accommodate the rope 12, the base 13 and the envelope 14 when the envelope is deflated. The container preferably contains a reel (not shown) for maintaining the rope 12 in coiled configuration and a cylinder of lighter-than-air fluid for filling the inflatable envelope 14. The container 11 serves as an anchoring base for the assembly 10 when the envelope is inflated, the container being adapted to be filled with stones, earth or other ballast material, or to be buried within the earth, or wedged in a tree or the like to maintain it against movement upon inflation of the envelope 14. The rope 12 is preferably of sufficient length to allow the envelope 14, when inflated, to arise to a desired height above the container 11.

The envelope 14 is formed of rubber, rubber composition, or plastic material which is impermeable to air and other fluids. The envelope 14 is also preferably impregnated with an electrically conductive material, such as a metallic powder, for example, aluminum or iron powder, so that the envelope, when inflated and elevated, may be readily detected by electrical detection means, such as radar. The envelope 14 when inflated is of appreciable size, on the order of from three to six feet in diameter so that it will present a relatively large surface for ready visual or electrical detection. That portion of the metallic impregnate for the envelope 14 lying upon the surface of the envelope will also provide a myriad light reflecting surfaces further enhancing the visibility of the balloon. The envelope 14 is provided with an elongated, generally cylindrical neck portion 15 (Figure 3) which provides an aperture for inflating or deflating the envelope.

The base 13 is adapted to be inserted within the neck portion 15 of the envelope 14, and includes an outer annular collar 16 having an outer diameter substantially the same as, or preferably slightly greater than, that of the neck portion 15 of the envelope and adapted to snugly receive the neck portion thereabout. The annular collar 16 is provided with interior threads 17, the threads 17 being adapted for threaded engagement with exterior threads 18 of a cylindrical insert 19.

The insert 19 is provided with a lower, outwardly directed, annular shoulder 20 for underlying the collar 16 in snug relation. The insert 19 is provided with a cylindrical bore 21 extending through the insert in parallel relation to the axis thereof, the bore 21 being adapted to receive a gas line 22 extending through the insert in communication with the interior of the envelope 14. The lower terminal end of the gas line 22 is provided with an intake valve 23 manually controlled by means of valve handle 24 and adapted to receive lighter-than-air fluid under pressure from a suitable source through inlet nipple 25. It will be seen that the interior of the envelope 14 may be readily filled with fluid under pressure through the gas inlet line 22 and the intake valve 24.

The cylindrical insert 19 is provided with a second, enlarged bore 26 extending parallel to the bore 21 and having internal threads 27 formed at the lower end thereof. The threaded portion 27 receives an exteriorly threaded plug 28 by threaded engagement. The bore 26 is sized to receive a dry cell or other type of battery 29, the battery being inserted and removed through the plug 28. A radially extending partition 30 extends across the bore 26 in spaced relation to the battery 29, the partition 30 being threadedly apertured as at 31 to receive a sheet metal or other type reflector 32 having an out turned lip 33 overlying the marginal portions of the upper cylindrical insert surface. The bulb 34 is threadedly retained by the reflector 32 for electrical contact with the dry cell 29. The plug 28 carries on its lower end a lamp switch 35 for selectively energizing the bulb 34 of the battery 29.

As illustrated in Figure 3 of the drawings, the switch 35 is utilized to energize the bulb 34 by the battery 29, which is provided with a first terminal arm 40 secured to the side of the battery case and depending therefrom. An annular contact ring 41 is provided to overlie the plug 28 and a plug contact 42 extends through the plug. A second contact arm 43 is provided for the battery 29 and this contact arm is secured to the bulb 34. The arm 43 is in good electrical contact with the contact post 44 extending axially of the plug 28. The switch 35 is provided with an inner sliding shoe 45 for closing the contacts 42 and 44 when in the position illustrated in Figure 3, thereby energizing the light source or bulb 34. The bulb may be de-energized by sliding movement of the switch shoe 45 from contact with each of the posts as hereinbefore described.

As shown in Figures 2 and 3, the envelope 14 is secured to the base 13, and more particularly against the outer surface of the annular collar 16, by means of an annular clamp 36 having generally parallel, radially outwardly extending ears 37 apertured to receive a pair of spaced bolts 38 extending therethrough and urging the clamp into extensive surface engagement with the outer surface of the neck 15 of the envelope 14 to confine the neck between the clamp 36 and the annular collar 16.

In order that the balloon 10 may be held captive, the U-shaped link 39 extends integrally from the exposed undersurface of the insert 19, thereby to provide a fastener to which the anchor rope 12 may be secured. Preferably, this fastener or link is located centrally of the insert 19 and, thus, approximately on the axis of the bore of the balloon neck portion 15. By this arrangement, stresses on the neck portion, arising when the balloon is held captive, are largely equalized.

The operation of the device and the advantages residing therein will be clearly evident from the foregoing disclosure and the attached drawings. The material forming the envelope 14 is translucent when stretched or extended by inflation of the envelope to the form shown in Figure 1 and light from the bulb 34 serves to illuminate the interior of the envelope, this light being transmitted by the envelope so that the balloon is readily visible even in poor light and under adverse weather conditions. The light may be selectively energized by means of the switch 35 and, if desired, automatic switch means may be readily provided. The improved visibility of the buoy because of the light transmitted therethrough, as well as the provision of a conductive impregnate material in the envelope itself, greatly enhances the possibility of discovery of the device.

In addition to the aforesaid advantages, the relatively small cost of the device will be readily appreciated inasmuch as the entire base structure 13 may be formed of molded plastic, rubber, or rubber composition material.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a signal buoy balloon including an inflatable envelope provided with an elongated inflation neck, the improvement comprising an annular collar having an exterior diameter greater than the interior diameter of said neck and adapted to receive said neck thereabout, a cylindrical insert adapted to be inserted within said annular collar and retained therein, said insert having a recess formed therein, a battery confined in said recess and an electric bulb receiving current from said battery for illuminating the interior of said envelope.

2. In a signal buoy balloon including an inflatable envelope having an elongated inflation neck, the improvement comprising an annular collar insertable within said neck, means clamping said neck about said annular collar, a cylindrical insert removably retained by said annular collar and having a bore therethrough communicating with the interior of said envelope, a fluid conduit mounted in said bore to receive fluid under pressure and communicating with the interior of said envelope, and valve means located in said conduit for controlling the introduction of fluid therethrough.

3. In a signal buoy balloon including an inflatable envelope having an elongated inflation neck, the improvement which comprises an annular collar adapted to be mounted in said neck, means encircling the exterior of said neck and confining said neck in contact with said collar, a cylindrical insert removably engaged by said collar and extending into said neck, a fluid inlet conduit extending through said insert for connection to a source of fluid under pressure and communicating with the interior of said envelope, a valve located in said conduit for controlling the introduction of fluid thereinto, a battery carried by said insert, a bulb energized by said battery and mounted in said neck for illuminating the interior of said envelope, and a switch mounted on said insert exteriorly of said neck for controlling the energization of said bulb.

4. In a signal buoy balloon including an inflatable envelope having an elongated inflation neck, the improvement comprising an annular collar insertable within said neck, means clamping said neck about said annular collar, a cylindrical insert removably retained by said annular collar to close the bore of same, and fastening means secured centrally of the face of said insert external to the balloon to receive an anchor line.

5. In a signal buoy balloon including an inflatable envelope having an elongated inflation neck, the improvement comprising an electrically insulating plug adapted to receive said neck snugly thereabout, electrical illumination means carried by said plug internally of said balloon for illuminating the same, and fastening means secured to the face of the plug external to the balloon to receive an anchor line.

6. In a signal buoy balloon including an inflatable envelope having an elongated inflation neck, the improvement comprising an annular collar insertable within said neck, means clamping said neck about said annular collar, a cylindrical electrically insulating insert removably retained by said annular collar to close the bore of the same, and electrical illumination means carried by said plug internally of said balloon for illuminating the same.

7. In a signal buoy balloon including an inflatable envelope having an elongated inflation neck, the improvement comprising a cylindrical plug to receive said neck snugly thereabout, a fluid inlet conduit extending through said plug for connection to an external source of fluid under pressure in communication with the interior of said envelope, electrical illumination means carried by said plug internally of said balloon for illuminating the same, a switch mounted on the exposed external face of said plug for controlling the energization of said illumination means, a valve located in the external end of said conduit for controlling the passage of fluid therethrough, and fastening means secured centrally of the external face of said plug to receive an anchor line.

HARRY MARTIN MARTIN.

REFERENCES CITED

The following references are of record in the file of this patent:

UNITED STATES PATENTS

| Number | Name | Date |
| --- | --- | --- |
| 2,415,118 | Walk | Feb. 4, 1947 |
| 2,492,800 | Isom | Dec. 27, 1949 |

FOREIGN PATENTS

| Number | Country | Date |
| --- | --- | --- |
| 199,435 | Great Britain | June 14, 1923 |
| 215,241 | Germany | Oct. 29, 1909 |
| 292,896 | Germany | June 4, 1919 |